(12) United States Patent
Chuang et al.

(10) Patent No.: US 8,373,404 B2
(45) Date of Patent: Feb. 12, 2013

(54) NEGATIVE LOCK LOOP AND CONTROL METHOD FOR A FLYBACK VOLTAGE CONVERTER

(75) Inventors: Chao-Hsuan Chuang, Jhubei (TW); Ching-Hsiang Yang, Tauyuan (TW); Cheng-Hsuan Fan, Hukou Shiang, Hsinchu County (TW); Hung-Che Chou, Jiadung Township, Pingtung County (TW)

(73) Assignee: Richtek Technology Corp., Hsinchu (TW)

( * ) Notice: Subject to any disclaimer, the term of this patent is extended or adjusted under 35 U.S.C. 154(b) by 484 days.

(21) Appl. No.: 12/591,079

(22) Filed: Nov. 6, 2009

(65) Prior Publication Data
US 2010/0117617 A1    May 13, 2010

(30) Foreign Application Priority Data
Nov. 10, 2008  (TW) ................................ 97143389 A

(51) Int. Cl.
*G05F 1/00*   (2006.01)
*H02M 3/335*  (2006.01)

(52) U.S. Cl. ..................................... 323/284; 363/21.12
(58) Field of Classification Search .... 363/21.12–21.16; 323/282–288
See application file for complete search history.

(56) References Cited

U.S. PATENT DOCUMENTS

| | | | | |
|---|---|---|---|---|
| 6,121,805 A * | 9/2000 | Thamsirianunt et al. | ...... | 327/175 |
| 6,337,647 B1 * | 1/2002 | Masson et al. | ................ | 341/150 |
| 6,813,170 B2 * | 11/2004 | Yang | .......................... | 363/56.09 |
| 7,825,737 B1 * | 11/2010 | Fang et al. | ...................... | 331/11 |

* cited by examiner

*Primary Examiner* — Adolf Berhane
*Assistant Examiner* — Emily Pham
(74) *Attorney, Agent, or Firm* — Muncy, Geissler, Olds & Lowe, PLLC

(57) ABSTRACT

A flyback voltage converter includes a transformer having a primary winding and a secondary winding, a switch serially connected to the primary winding for being switched to produce a current in the secondary winding, and a negative lock loop to adjust the peak value of the current in the secondary winding according to a current conduction time during which the current in the secondary winding is higher than a current threshold, such that the peak value of the current in the secondary winding will be in inverse proportion to the time.

10 Claims, 9 Drawing Sheets

NEGATIVE LOCK LOOP AND CONTROL METHOD FOR A FLYBACK VOLTAGE CONVERTER

FIELD OF THE INVENTION

The present invention is related generally to a flyback voltage converter and, more particularly, to a negative lock loop and control method for a flyback voltage converter.

BACKGROUND OF THE INVENTION

FIG. 1 is a circuit diagram of a conventional flyback voltage converter 10, in which a bridge rectifier 12 rectifies an AC input voltage VAC to produce a DC input voltage VIN, a transformer 16 has a primary winding Lp, a secondary winding Ls and an auxiliary winding La, a power switch SW is serially connected to the primary winding Lp, and a controller 14 switches the power switch SW to convert the DC input voltage VIN into an output voltage VOUT. FIG. 2 is a waveform diagram of the current Is in the secondary winding Ls and the voltage Vds across the secondary winding Ls. FIG. 3 is a waveform diagram of the peak value Is_pk of the current Is and the current conduction time Toff during which the current Is in the secondary winding Ls is greater than zero. Referring to FIGS. 1 and 2, during the power switch SW is on, for example, from time t1 to time t2 in FIG. 2, a current Ip is generated in the primary winding Lp, the voltage Vds across the secondary winding Ls has a negative value, and there is no current in the secondary winding Ls. At time t2, the power switch SW is turned off so that the voltage Vds across the secondary winding Ls changes to be positive and in consequence, the current Is is induced in the secondary winding Ls. Then, as shown by waveform 20, the current Is decreases slowly until it reaches zero at time t3. Assuming that the power switch SW has a switching cycle Ts, the current Is in the secondary winding Ls will have the average value $$Io = 0.5 \times Is\_pk \times Toff/Ts, \quad [\text{Eq-1}]$$

where Is_pk is the peak value of the current Is. From the equation Eq-1, it is obtained the peak value $$Is\_pk = 2 \times Io \times Ts/Toff. \quad [\text{Eq-2}]$$

Ideally, the output voltage VOUT of the flyback voltage converter 10 is constant, which requires the average current Io be constant and the switching cycle Ts of the power switch SW also be constant. Therefore, it can be known from the equation Eq-2 that the product of the peak value Is_pk and current conduction time Toff of the current Is in the secondary winding Ls is constant, or the peak value Is_pk is in inverse proportion to the current conduction time Toff. As shown in FIG. 3, the peak value Is_pk decreases as the current conduction time Toff increases.

Therefore, it is desired an approach for rendering the peak value Is_pk being in inverse proportion to the current conduction time Toff.

SUMMARY OF THE INVENTION

An object of the present invention is to provide a negative lock loop for a flyback voltage converter.

An object of the present invention is to provide a control method for a flyback voltage converter for controlling the peak value of the current in a secondary winding of the flyback voltage converter being in inverse proportion to a current conduction time of the current in the secondary winding.

According to the present invention, a negative lock loop and control method for a flyback voltage converter adjust the peak value of the current in a secondary winding of the flyback voltage converter according to the current conduction time of the current in the secondary winding, during which the current in the secondary winding is greater than a current threshold, such that the peak value will be in inverse proportion to the current conduction time. The negative lock loop includes a current source, a capacitor, a first switch connected between the current source and capacitor, a second switch parallel connected with the capacitor, a comparator connected to the capacitor, and a logic circuit coupled to the comparator. A first clock switches the first switch such that the current source provides a charging current to charge the capacitor, and a second clock switches the second switch to reset the capacitor. During the current conduction time, the first clock turns on the first switch to charge the capacitor. The comparator compares the voltage of the capacitor with a voltage threshold to generate a comparison signal. The logic circuit adjusts the charging current according to the comparison signal and the first and second clocks such that the charging current is in inverse proportion to the on-time of the first clock. The peak value of the current in the secondary winding is adjusted according to the charging current such that the peak value of the current in the secondary winding is in inverse proportion to the current conduction time.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
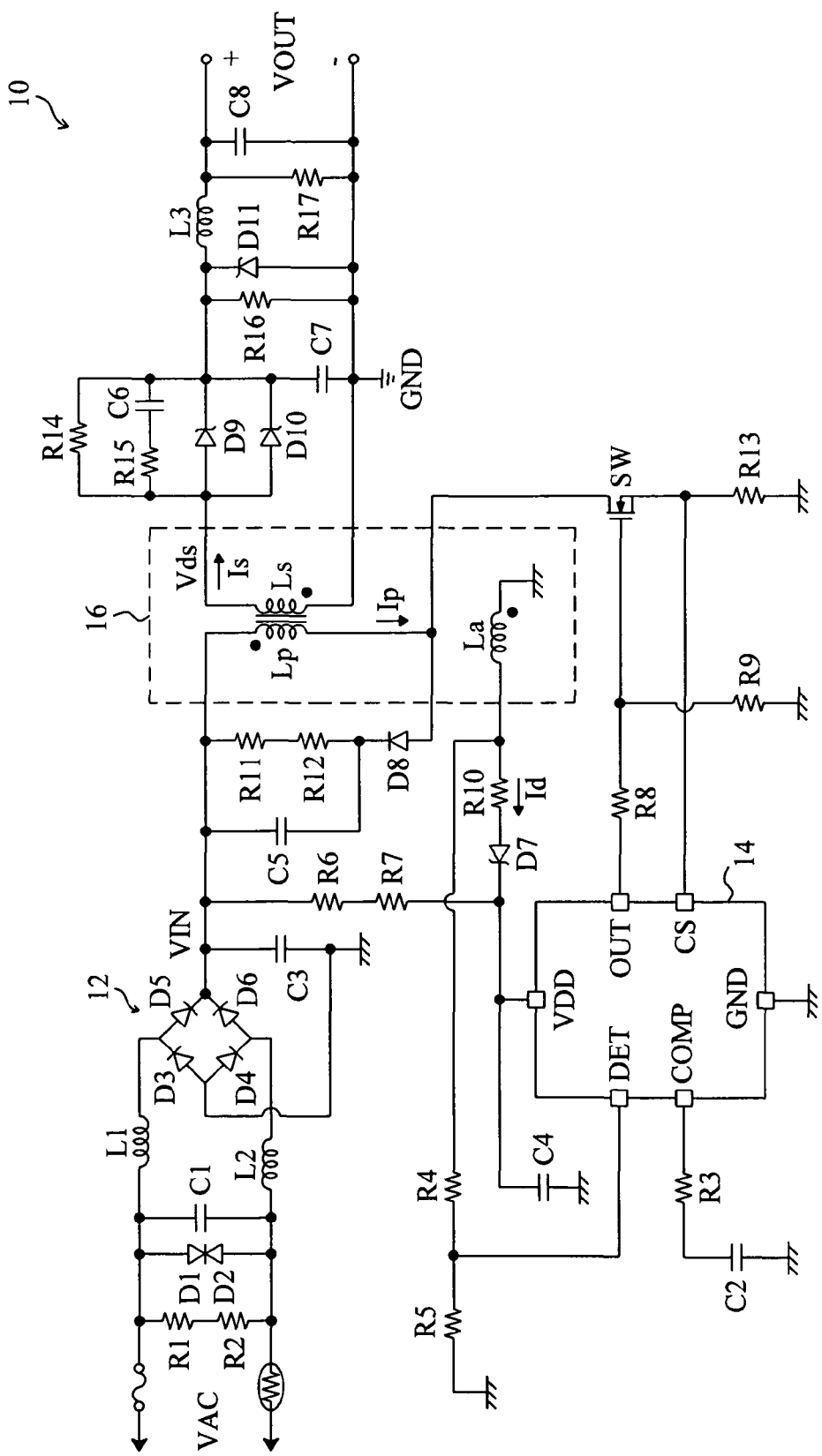
FIG. 1 is a circuit diagram of a conventional flyback voltage converter.
Figure 2:
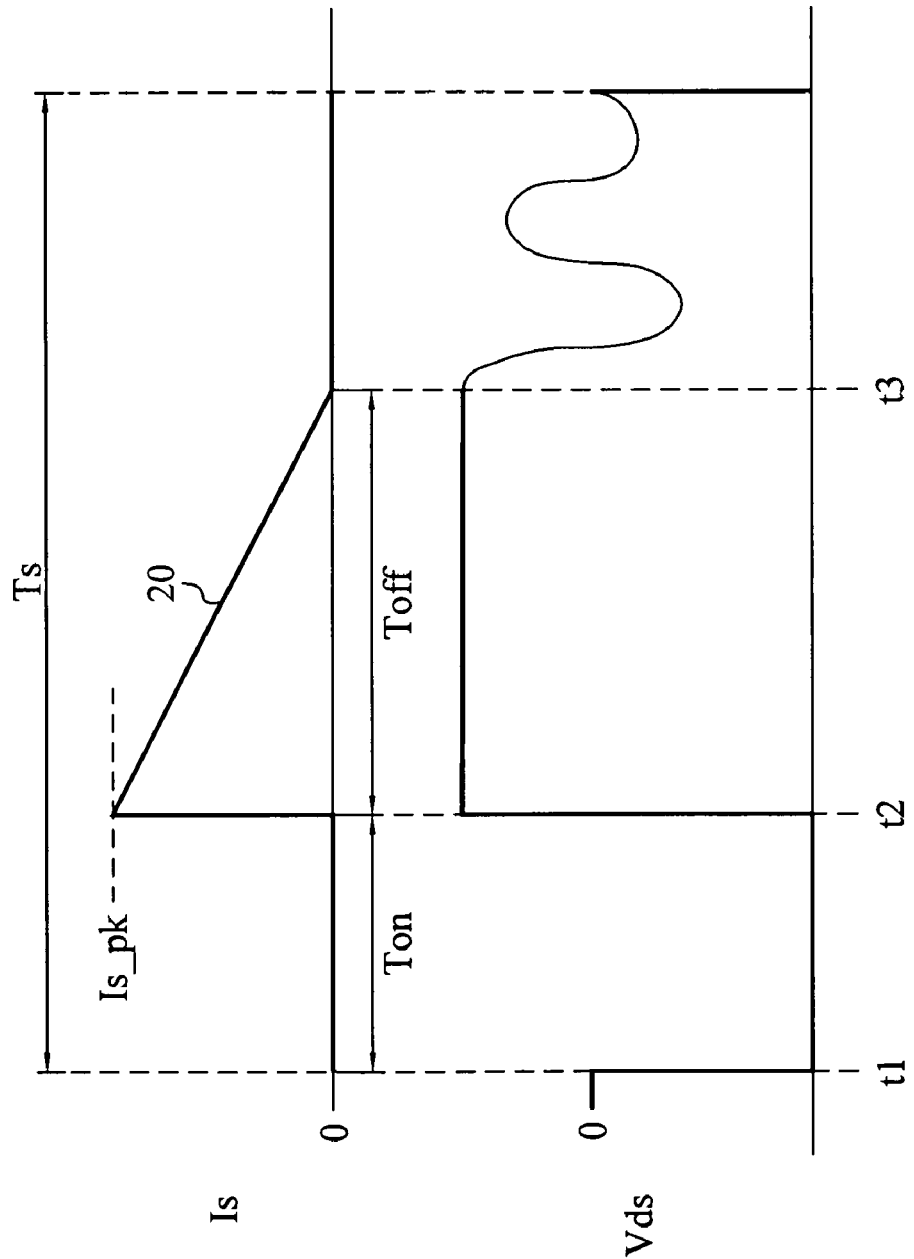
FIG. 2 is a waveform diagram of the current in the secondary winding and the voltage across the secondary winding shown in FIG. 1.
Figure 3:
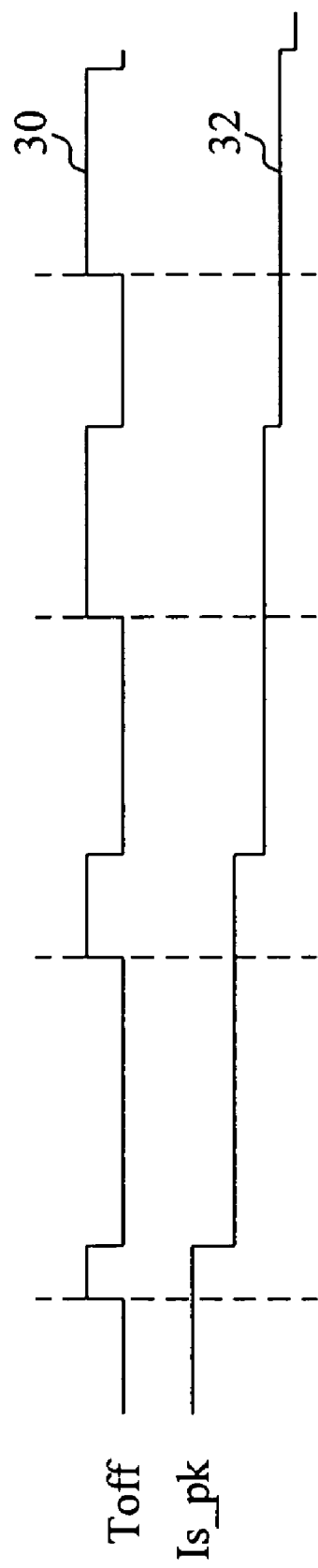
FIG. 3 is a waveform diagram of the peak value of the current in the secondary winding and the current conduction time during which the current in the secondary winding is greater than zero.
Figure 4:
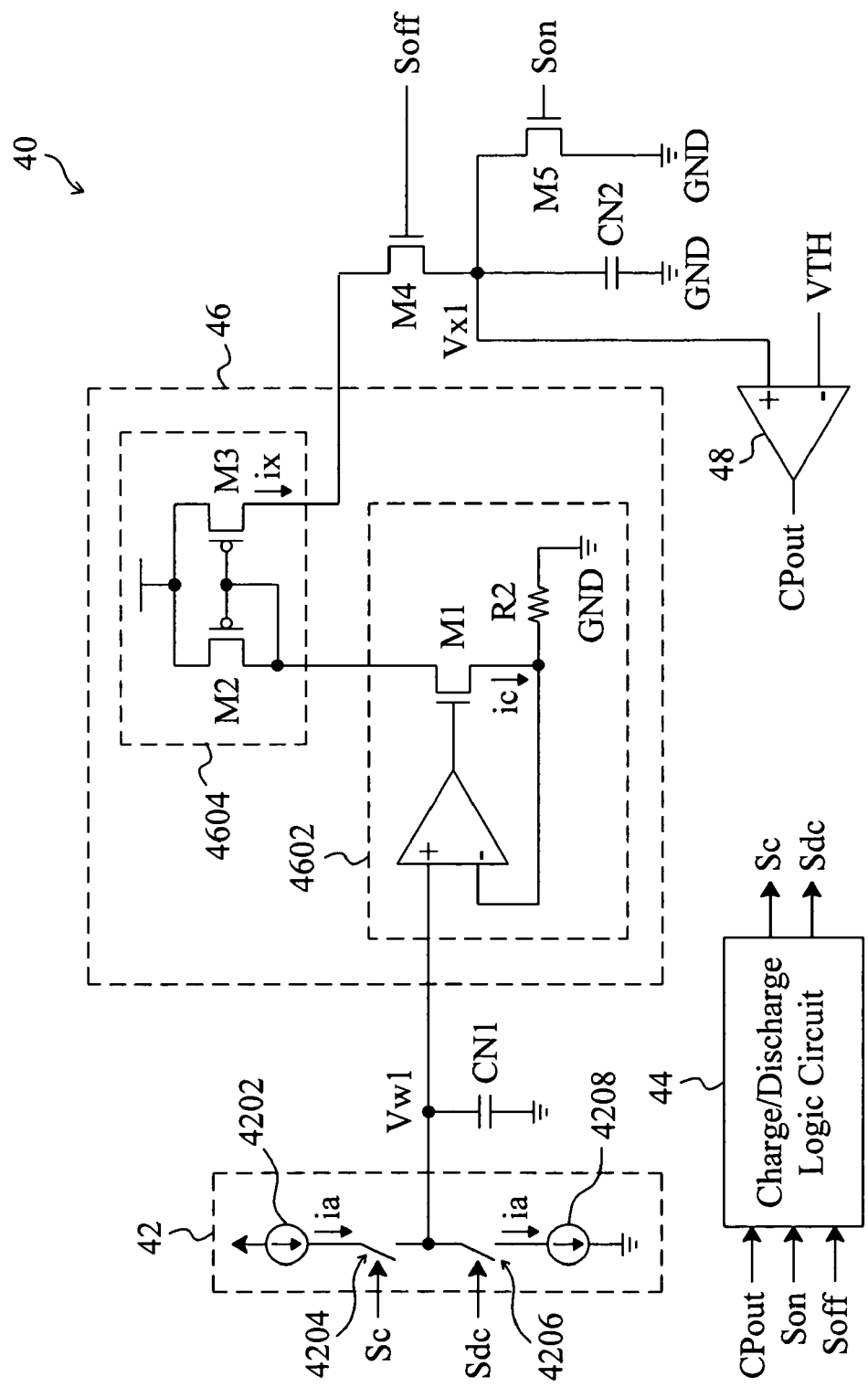
FIG. 4 is a circuit diagram of a negative lock loop according to the present invention for application to the flyback voltage converter shown in FIG. 1.

FIG. 4 is a circuit diagram of a negative lock loop 40 according to the present invention for application to the flyback voltage converter 10 shown in FIG. 1. A charge/discharge control circuit 42, which includes serially connected current sources 4202 and 4208 and switches 4204 and 4206, controls the charging and discharging of a capacitor CN1 according to a charging signal Sc and a discharging signal Sdc, to thereby generate a voltage Vw1 by the capacitor CN1. The current source 4202 and switch 4204 are connected in series between a power source and the capacitor CN1, the switch 4206 and current source 4208 are connected in series between the capacitor CN1 and a ground terminal, and the charging signal Sc and discharging signal Sdc control the switches 4204 and 4206, respectively. A current source 46, which includes a voltage-to-current converter 4602 and a current mirror 4604, generates a charging current ix according to the voltage Vw1. The voltage-to-current converter 4602 converts the voltage Vw1 into a reference current ic, and the current mirror 4604 mirrors the reference current ic to generate the charging current ix. A switch M4 is connected between the current source 46 and a capacitor CN2, and a clock Soff switches the switch M4 to charge the capacitor CN2 by the charging current ix. The clock Soff is generated by detecting the current Is in the secondary winding Ls of the flyback voltage converter 10. When the current Is is greater than zero, as during the current conduction time Toff shown in FIG. 2, the clock Soff is high and the switch M4 is turned on accordingly, thereby charging the capacitor CN2. A switch M5 is parallel connected with the capacitor CN2, and a clock Son switches the switch M5 to reset the capacitor CN2. When the power switch SW shown in FIG. 1 is on, the clock Son is high and the switch M5 is turned on accordingly, thereby resetting the capacitor CN2. A comparator 48 compares the voltage Vx1 of the capacitor CN2 with a voltage threshold VTH to generate a comparison signal CPout. A charge/discharge logic circuit 44 generates the charging signal Sc and discharging signal Sdc according to the comparison signal CPout and the clocks Son and Soff so as to adjust the voltage Vw1 and thereby the charging current ix, such that the charging current ix will be in inverse proportion to the on-time of the clock Soff. The charging current ix is used to adjust the peak value Is_pk of the current Is in the secondary winding Ls such that the peak value Is_pk is in inverse proportion to the current conduction time Toff.

Figure 5:
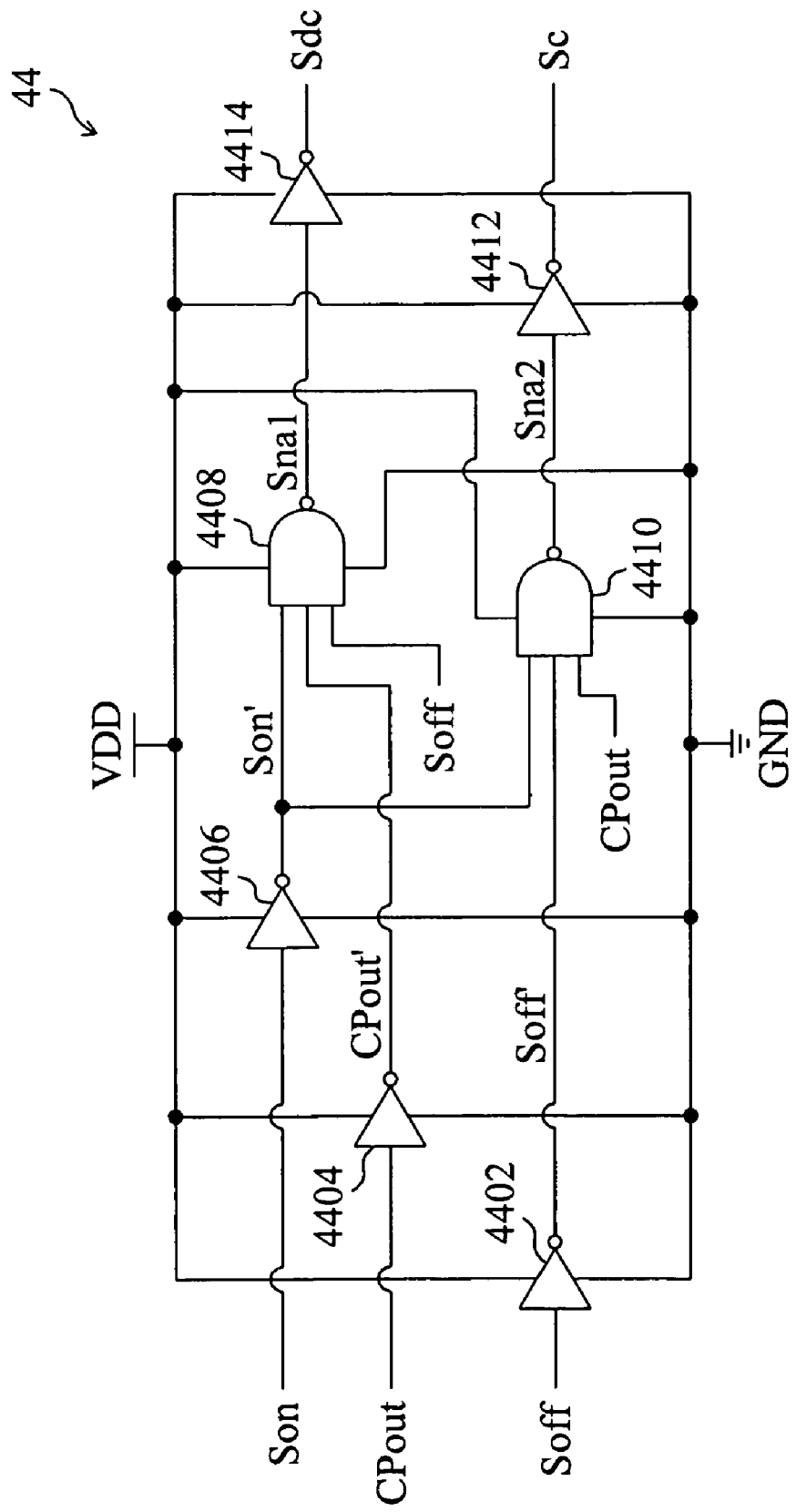
FIG. 5 is a circuit diagram of an embodiment for the charge/discharge logic circuit shown in FIG. 4.

FIG. 5 is a circuit diagram of an embodiment for the charge/discharge logic circuit 44, in which an inverter 4402 generates a signal Soff' according to the clock Soff, an inverter 4404 generates a signal CPout' according to the comparison signal CPout, an inverter 4406 generates a signal Son' according to the clock Son, a NAND gate 4408 generates a signal Sna1 according to the signals Son', CPout' and Soff, a NAND gate 4410 generates a signal Sna2 according to the signals Son', Soff' and CPout, and inverters 4412 and 4414 generate the charging signal Sc and discharging signal Sdc according to the signals Sna2 and Sna1, respectively, resulting in the charging signal $$Sc = Son' \times Soff \times CPout,$$ [Eq-3]

and discharging signal $$Sdc = Son' \times Soff \times CPout'.$$ [Eq-4]

Figure 6:
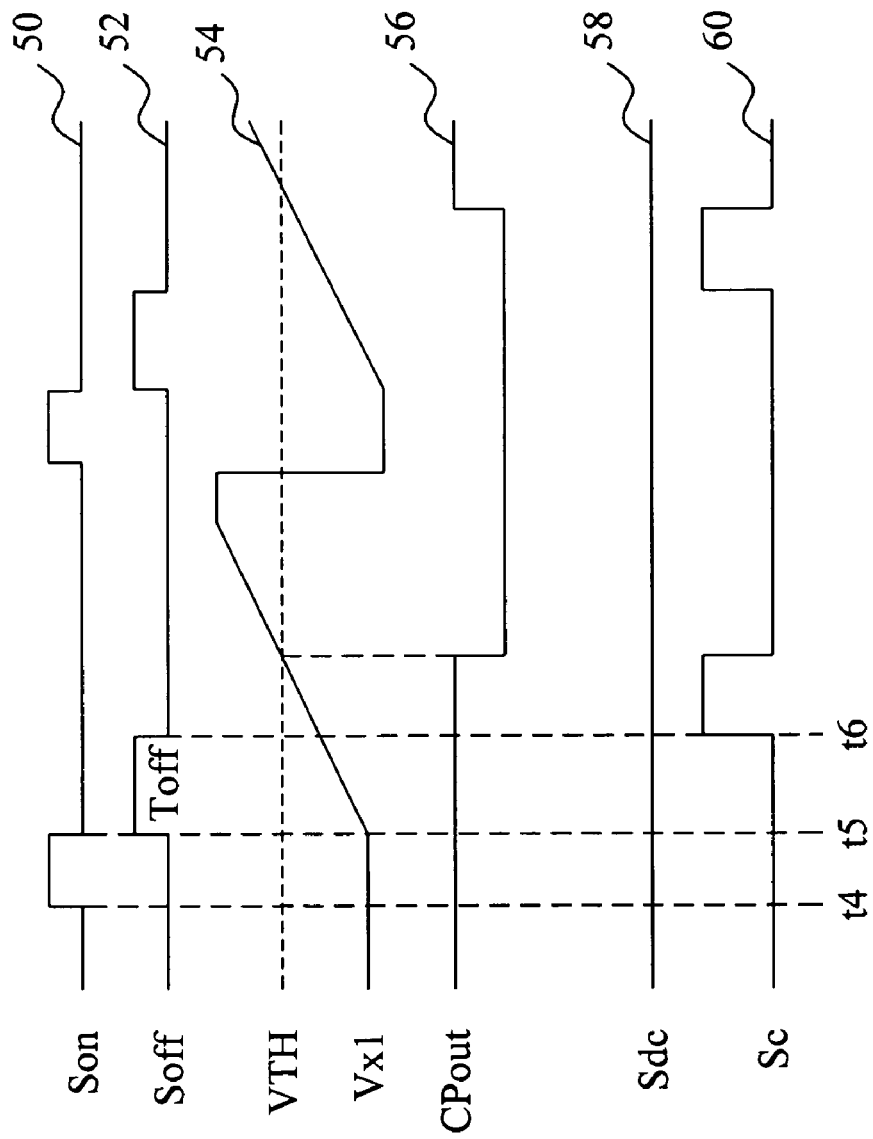
FIG. 6 is a timing diagram of a charging process with the charge/discharge control circuit shown in FIG. 4.

FIG. 6 is a timing diagram of a charging process with the charge/discharge control circuit 42, in which waveform 50 represents the clock Son, waveform 52 represents the clock Soff, waveform 54 represents the voltage Vx1, waveform 56 represents the comparison signal CPout, waveform 58 represents the discharging signal Sdc, and waveform 60 represents the charging signal Sc. Referring to FIGS. 4 and 6, the clock Son turns to high at time t4 so that the capacitor CN2 is reset and in consequence, the voltage Vx1 becomes zero. At time t5, the clock Son turns to low and the clock Soff turns to high, so that the charging current ix begins to charge the capacitor CN2, thereby raising the voltage Vx1. When the clock Soff turns to low at time t6, the charging signal Sc will turn to high if the voltage Vx1 is below the voltage threshold VTH, thus allowing the current source 4202 to charge the capacitor CN1 and consequently, the voltage Vw1 increases and the charging current ix increases accordingly. When the clock Soff turns to low, the voltage Vx1 will be equal to the voltage threshold VTH. In this embodiment, when the clock Soff turns to low, a latch circuit (not shown in the figure) allows the capacitor CN2 to continue being charged.

Figure 7:
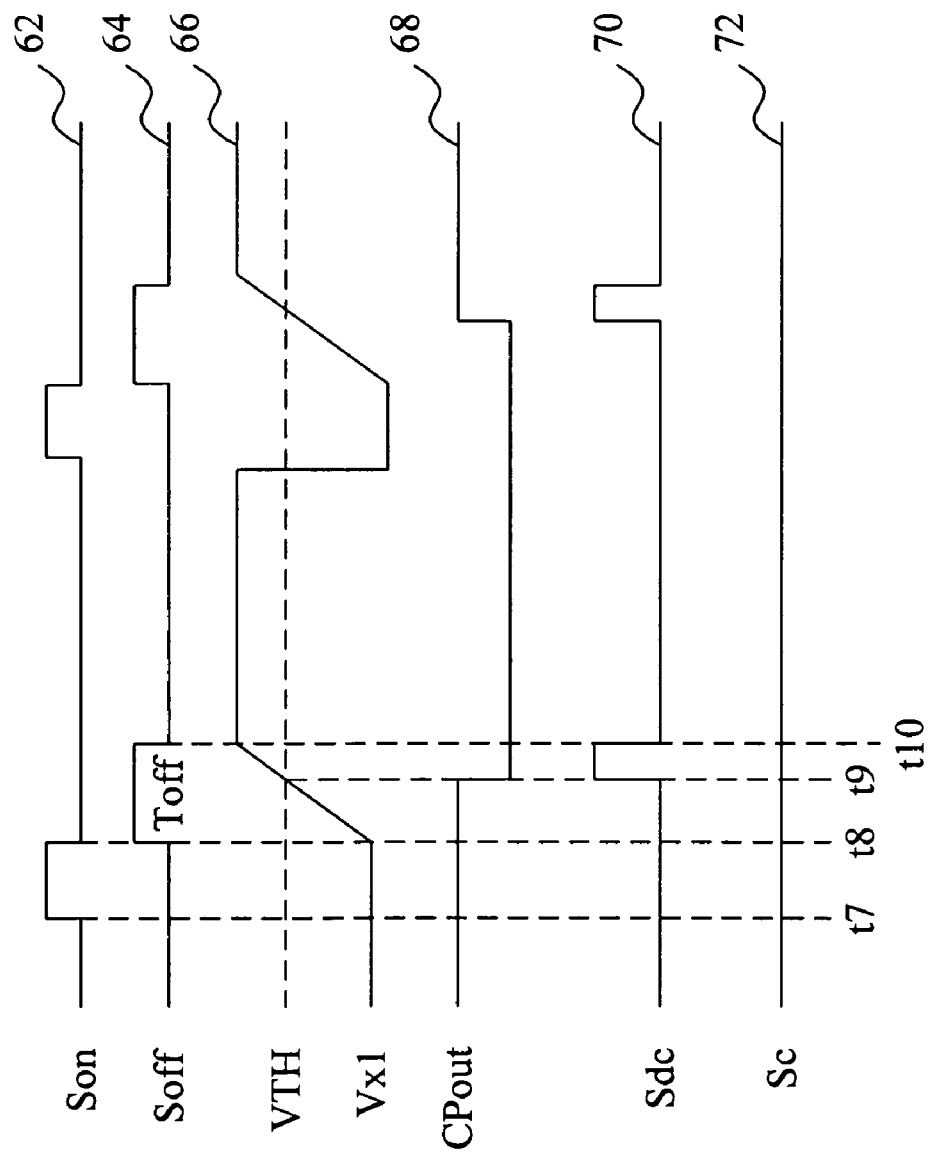
FIG. 7 is a timing diagram of a discharging process with the charge/discharge control circuit shown in FIG. 4.

FIG. 7 is a timing diagram of a discharging process with the charge/discharge control circuit 42, in which waveform 62 represents the clock Son, waveform 64 represents the clock Soff, waveform 66 represents the voltage Vx1, waveform 68 represents the comparison signal CPout, waveform 70 represents the discharging signal Sdc, and waveform 72 represents the charging signal Sc. Referring to FIG. 4 and FIG. 7, the clock Son turns to high at time t7 so that the capacitor CN2 is reset, and the voltage Vx1 becomes zero accordingly. At time t8, the clock Son turns to low and the clock Soff turns to high and consequently, the charging current ix begins to charge the capacitor CN2 and the voltage Vx1 starts to increase accordingly. When the voltage Vx1 reaches the voltage threshold VTH, the comparison signal CPout turns to low if the clock Soff has not turned to low, as shown at time t9, and thus the discharging signal Sdc turns to high to allow the current source 4208 to discharge the capacitor CN1. In consequence, the voltage Vw1 decreases and the charging current ix is lowered accordingly. The capacitor CN1 is discharged until the clock Soff turns to low, and when the clock Soff turns to low, the voltage Vx1 will be equal to the voltage threshold VTH.

Figure 8:
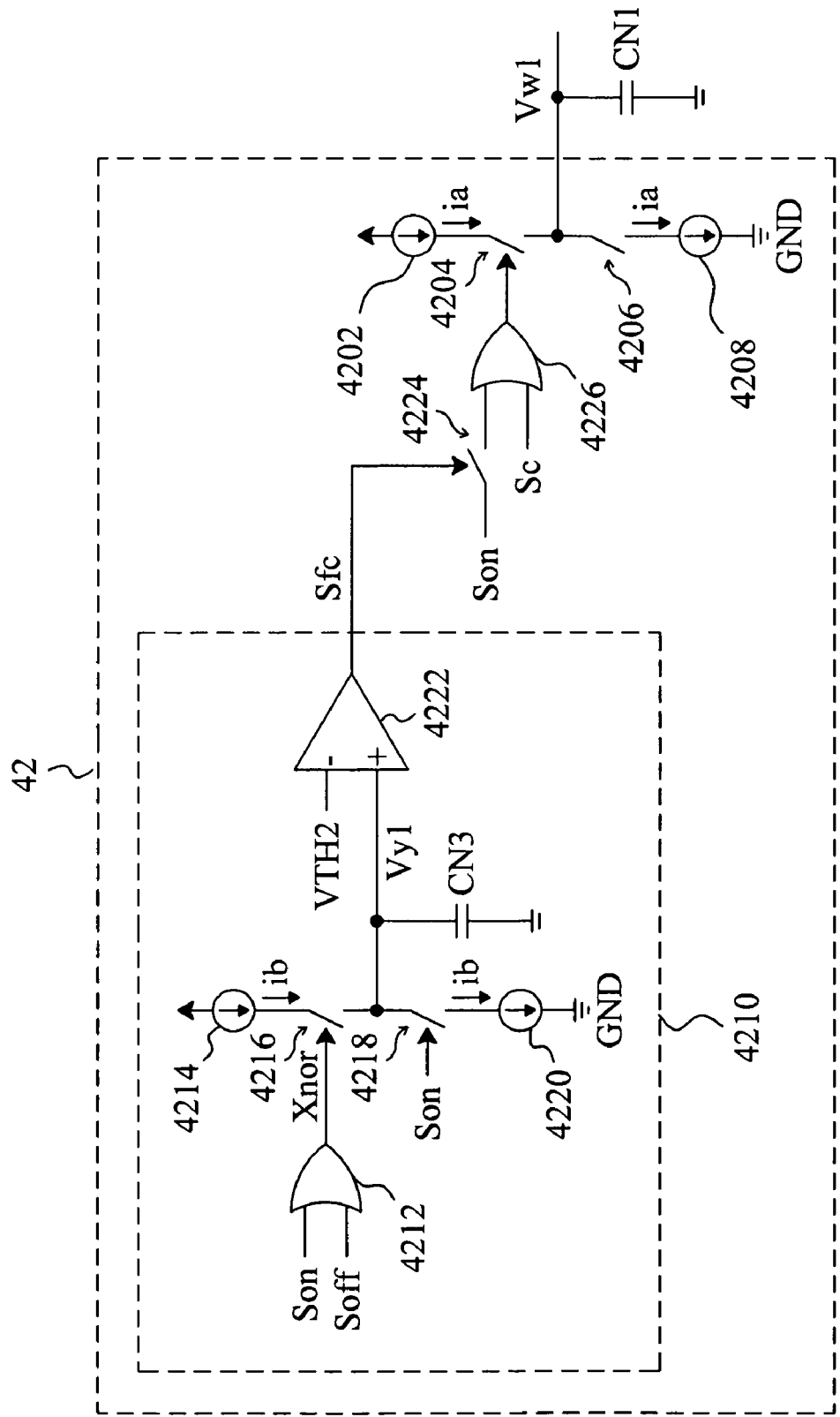
FIG. 8 is a circuit diagram of another embodiment for the charge/discharge control circuit shown in FIG. 4.

FIG. 8 is a circuit diagram of another embodiment for the charge/discharge control circuit 42. In addition to the serially connected current sources 4202 and 4208 and switches 4204 and 4206, an OR gate 4226 has a first input receiving the charging signal Sc and a second input receiving the clock Son through a switch 4224 to thereby determine its output to switch the switch 4204, and a forcing circuit 4210 asserts a signal Sfc when the current conduction time Toff exceeds a time threshold, to turn on the switch 4224 to allow the clock Son passing through the OR gate 4226 to turn on the switch 4204 for a while, thereby preventing a latch condition which might otherwise occur when the capacitor CN1 is charged for too short a time. In the forcing circuit 4210, a NOR gate 4212 generates a signal Xnor according to the clocks Son and Soff, a current source 4214 and a switch 4216 are connected in series between a power source and a capacitor CN3, a current source 4220 and a switch 4218 are connected in series between the capacitor CN3 and a ground terminal, the signal Xnor switches the switch 4216 to charge the capacitor CN3, the signal Son switches the switch 4218 to discharge the capacitor CN3 by the current source 4220, and a comparator 4222 compares the voltage Vy1 of the capacitor CN3 with a voltage threshold VTH2 to generate the signal Sfc.

Figure 9:
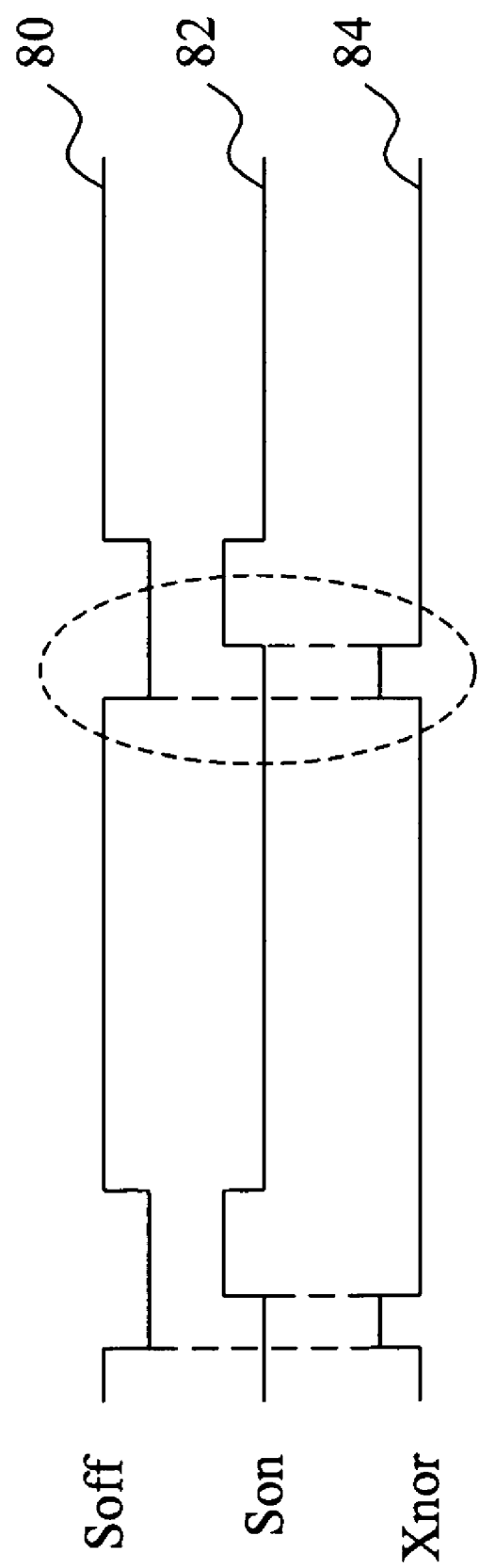
FIG. 9 is a waveform diagram of the charge/discharge control circuit shown in FIG. 8.

FIG. 9 is a waveform diagram of the charge/discharge control circuit 42 shown in FIG. 8, in which waveform 80 represents the clock Soff, waveform 82 represents the clock Son, and waveform 84 represents the signal Xnor. Referring to FIGS. 8 and 9, as the on-time Toff of the clock Soff is longer, the on-time of the signal Xnor becomes shorter. If the on-time of the signal Xnor is shorter than the on-time of the clock Son, the voltage Vy1 of the capacitor CN3 will decrease. When the voltage Vy1 is below the voltage threshold VTH2, the comparator 4222 triggers the signal Sfc to turn on the switch 4224.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A negative lock loop for a flyback voltage converter including a transformer having a primary winding and a secondary winding and a power switch serially connected to the primary winding, the negative lock loop comprising:
   a current source for providing a charging current which determines a peak value of a current in the secondary winding;
   a capacitor;

a first switch connected between the current source and capacitor, for being controlled by a first clock to charge the capacitor by the charging current;

a second switch parallel connected with the capacitor, for being controlled by a second clock to reset the capacitor;

a comparator coupled to the capacitor for generating a comparison signal by comparing a voltage of the capacitor with a voltage threshold; and a logic circuit coupled to the comparator for adjusting the charging current according to the comparison signal and the first and second clocks;

wherein the first clock turns on the first switch when the current in the secondary winding is greater than a current threshold, to thereby allow the charging current to charge the capacitor, and the second clock turns on the second switch when the power switch is on, to thereby reset the capacitor.

2. The negative lock loop of claim 1, further comprising:

a second capacitor; and a charge/discharge control circuit connected to the second capacitor and logic circuit for charging and discharging the second capacitor according to an output of the logic circuit so as to adjust the charging current.

3. The negative lock loop of claim 2, wherein the current source comprises:

a voltage-to-current converter connected to the second capacitor for converting a voltage of the second capacitor into a reference current; and a current mirror connected to the voltage-to-current converter for mirroring the reference current to generate the charging current.

4. A negative lock loop for a flyback voltage converter including a transformer having a primary winding and a secondary winding and a power switch serially connected to the primary winding, the negative lock loop comprising:

a current source for providing a charging current which determines a peak value of a current in the secondary winding;

a capacitor;

a first switch connected between the current source and capacitor, for being controlled by a first clock to charge the capacitor by the charging current;

a second switch parallel connected with the capacitor, for being controlled by a second clock to reset the capacitor;

a comparator coupled to the capacitor for generating a comparison signal by comparing a voltage of the capacitor with a voltage threshold; and a logic circuit coupled to the comparator for adjusting the charging current according to the comparison signal and the first and second clocks;

a second capacitor; and a charge/discharge control circuit connected to the second capacitor and logic circuit for charging and discharging the second capacitor according to an output of the logic circuit so as to adjust the charging current;

wherein the first clock turns on the first switch when the current in the secondary winding is greater than a current threshold, to thereby allow the charging current to charge the capacitor, and the second clock turns on the second switch when the power switch is on, to thereby reset the capacitor;

wherein the charge/discharge control circuit comprises:

a second current source;

a third switch connected between the second current source and second capacitor, for being controlled by a charging signal provided by the logic circuit to charge the second capacitor by the second current source;

a third current source; and a fourth switch connected between the second capacitor and third current source, for being controlled by a discharging signal provided by the logic circuit to discharge the second capacitor by the third current source.

5. The negative lock loop of claim 4, wherein the charge/discharge control circuit further comprises a forcing circuit for turning on the third switch for a while when the current in the secondary winding is greater than the current threshold for a time longer than a time threshold.

6. The negative lock loop of claim 5, wherein the forcing circuit comprises:

a third capacitor;

a fourth current source;

a fifth switch connected between the fourth current source and third capacitor, for being controlled by a first signal generated according to the first and second clocks to charge the third capacitor by the fourth current source;

a fifth current source;

a sixth switch connected between the third capacitor and fifth current source, for being controlled by the second clock to discharge the third capacitor by the fifth current source; and a second comparator connected to the third capacitor for generating a second signal by comparing a voltage of the third capacitor with a second voltage threshold to turn on the third switch.

7. A control method for a flyback voltage converter including a transformer having a primary winding and a secondary winding and a power switch serially connected to the primary winding, the control method comprising the steps of:

providing a charging current for determining a peak value of a current in the secondary winding;

under control of a first clock and a second clock, charging a capacitor by the charging current when the current in the secondary winding is greater than a current threshold, and resetting the capacitor when the power switch is on;

comparing a voltage of the capacitor with a voltage threshold to generate a comparison signal; and adjusting the charging current according to the comparison signal and the first and second clocks such that the charging current is in inverse proportion to a current conduction time during which the current in the secondary winding is greater than the current threshold.

8. The control method of claim 7, further comprising the step of generating the charging current according to a voltage of a second capacitor.

9. The control method of claim 8, wherein the step of adjusting the charging current according to the comparison signal and the first and second clocks comprises the step of charging and discharging the second capacitor according to the comparison signal and the first and second clocks.

10. The control method of claim 9, further comprising the step of charging the second capacitor for a while when the current in the secondary winding is greater than the current threshold for a time longer than a time threshold.

* * * * *